US000001395H

United States Statutory Invention Registration [19]

[11] Reg. Number: H1395

Prosser

[43] Published: Jan. 3, 1995

[54] COMPOSITION AND METHOD OF PREPARING REDUCED FAT SPREADS

[75] Inventor: Shawna L. Prosser, Decatur, Ill.

[73] Assignee: A. E. Staley Manufacturing Company, Decatur, Ill.

[21] Appl. No.: 887,984

[22] Filed: May 22, 1992

[51] Int. Cl.[6] ..... A23L 1/38; A23L 1/05

[52] U.S. Cl. ..... 426/633; 426/519; 426/578

[58] Field of Search ..... 426/578, 633, 519

[56] References Cited

U.S. PATENT DOCUMENTS

| | | | |
|---|---|---|---|
| 675,822 | 6/1901 | Duryea . | |
| 696,949 | 4/1902 | Duryea . | |
| 2,068,051 | 1/1937 | Canton et al. | 426/578 |
| 2,131,064 | 9/1938 | Musher | 426/633 |
| 2,503,053 | 4/1950 | Kerr | 127/38 |
| 2,791,508 | 5/1957 | Rivoche | 426/573 |
| 2,805,995 | 9/1957 | Adelson | 252/33.6 |
| 2,978,446 | 4/1961 | Battista et al. | 260/212 |
| 3,023,104 | 2/1962 | Battista | 99/1 |
| 3,067,067 | 12/1962 | Etheridge et al. | 127/71 |
| 3,093,486 | 6/1963 | Krett et al. | 99/144 |
| 3,133,836 | 5/1964 | Winfrey | 127/71 |
| 3,197,337 | 7/1965 | Schink | 127/28 |
| 3,219,483 | 11/1965 | Goos | 127/28 |
| 3,351,489 | 11/1967 | Battista | 127/32 |
| 3,532,602 | 10/1970 | Seidman | 195/31 |
| 3,556,942 | 1/1971 | Hathaway | 195/31 |
| 3,582,359 | 6/1971 | Horn | 426/573 |
| 3,586,536 | 6/1971 | Germino et al. | 127/32 |
| 3,600,186 | 8/1971 | Mattson et al. | 99/1 |
| 3,666,557 | 5/1972 | Jensen et al. | 127/32 |
| 3,671,269 | 6/1972 | Germino | 99/139 |
| 3,705,811 | 11/1972 | Yoshida et al. | 99/91 |
| 3,717,475 | 2/1973 | Germino et al. | 99/134 |
| 3,730,840 | 5/1973 | Sugimoto et al. | 195/31 R |
| 3,830,697 | 8/1974 | Yoshida | 195/31 R |
| 3,879,212 | 4/1975 | Yoshida | 106/213 |
| 3,881,991 | 5/1975 | Kurimoto | 195/31 |
| 3,883,365 | 5/1975 | Forsberg | 127/60 |
| 3,928,062 | 12/1975 | Yamauchi | 127/60 |
| 3,962,465 | 6/1976 | Richter et al. | 426/48 |
| 3,986,890 | 10/1976 | Richter et al. | 127/38 |
| 4,009,291 | 2/1977 | Mitchell et al. | 426/548 |
| 4,069,157 | 1/1978 | Hoover et al. | 210/433 M |
| 4,143,163 | 3/1979 | Hutchison | 426/96 |
| 4,143,174 | 3/1979 | Shah | 426/570 |

(List continued on next page.)

FOREIGN PATENT DOCUMENTS 1016006 8/1977 Canada .

(List continued on next page.)

OTHER PUBLICATIONS

"Paselli SA2; The Natural Alternative to Fats and OIls" (AVEBE b.a., Foxol, Holland, Ref. No. 05.12.31.167 EF).

(List continued on next page.)

*Primary Examiner*—Shean Wu

*Attorney, Agent, or Firm*—Arnold, White & Durkee

[57] ABSTRACT

A food composition useful as a peanut spread and having a reduced level of fat and/or oil is provided. The composition is a macroscopically homogeneous blend of an peanut component and an aqueous phase associated with a fragmented granular starch hydrolysate. The fragmented granular starch hydrolysate is capable of forming an aqueous dispersion at 20% starch hydrolysate solids having a yield stress of from about 100 to about 1,500 pascals. Also provided is a method of preparing a peanut spread which comprises making a premix of the granular starch hydrolysate and water, fragmenting the granular starch hydrolysate and then blending the resulting particle gel with a peanut component to produce a macroscopically homogeneous blend.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 4,192,900 | 3/1980 | Cheng | 426/578 |
| 4,199,374 | 4/1980 | Dwivedi | 127/60 |
| 4,209,503 | 6/1980 | Shah | 424/49 |
| 4,263,334 | 4/1981 | McGinley | 426/573 |
| 4,276,312 | 6/1981 | Merritt | 426/96 |
| 4,291,065 | 9/1981 | Zobel et al. | 426/549 |
| 4,305,964 | 12/1981 | Moran | 426/99 |
| 4,308,294 | 12/1981 | Rispoli et al. | 426/564 |
| 4,423,084 | 12/1983 | Trainor et al. | 426/589 |
| 4,477,480 | 10/1984 | Seidel et al. | 426/578 |
| 4,492,714 | 1/1985 | Cooper et al. | 426/602 |
| 4,510,166 | 4/1985 | Lenchin et al. | 426/565 |
| 4,533,254 | 8/1985 | Cook et al. | 366/176 |
| 4,536,408 | 8/1985 | Morehouse et al. | 426/250 |
| 4,551,177 | 11/1985 | Trubiano et al. | 106/210 |
| 4,560,559 | 12/1985 | Ottenberg | 426/19 |
| 4,587,131 | 5/1986 | Bodor et al. | 426/603 |
| 4,591,507 | 5/1986 | Bodor et al. | 426/604 |
| 4,643,773 | 2/1987 | Day | 127/30 |
| 4,670,272 | 6/1987 | Chen | 426/573 |
| 4,726,957 | 2/1988 | Lacourse | 426/578 |
| 4,728,526 | 3/1988 | Avera | 426/633 |
| 4,744,987 | 5/1988 | Mehra | 424/156 |
| 4,761,292 | 8/1988 | Augustine et al. | 426/321 |
| 4,787,939 | 11/1989 | Barker | 127/37 |
| 4,810,646 | 3/1989 | Jamas | 435/101 |
| 4,814,195 | 3/1989 | Yokoyama et al. | 426/633 |
| 4,828,868 | 5/1989 | Lasdon et al. | 426/633 |
| 4,832,977 | 5/1989 | Avera | 426/633 |
| 4,859,484 | 8/1989 | Bielskis | 426/96 |
| 4,869,919 | 9/1989 | Lowery | 426/604 |
| 4,885,180 | 12/1989 | Cochran et al. | 426/241 |
| 4,886,678 | 12/1989 | Chiu | 426/578 |
| 4,911,946 | 3/1990 | Singer et al. | 426/658 |
| 4,917,915 | 4/1990 | Cain et al. | 426/573 |
| 4,937,091 | 6/1990 | Zallie | 426/582 |
| 4,942,055 | 7/1990 | Avera | 426/633 |
| 4,948,615 | 8/1990 | Zallie | 426/573 |
| 4,957,750 | 9/1990 | Cochran et al. | 426/19 |
| 4,962,094 | 10/1990 | Jamas | 514/54 |
| 4,971,723 | 11/1990 | Chiu | 252/315.3 |
| 4,981,709 | 1/1991 | Furcsik et al. | 426/565 |
| 4,988,531 | 1/1991 | Moore | 426/578 |
| 4,990,355 | 2/1991 | Gupta | 426/602 |
| 5,034,240 | 7/1991 | Tanaka et al. | 426/607 |
| 5,035,904 | 7/1991 | Huang et al. | 426/243 |
| 5,037,929 | 8/1991 | Rajagopalan | 426/578 |
| 5,051,271 | 9/1991 | Iyengar et al. | 426/658 |
| 5,094,872 | 3/1992 | Furcsik et al. | 426/578 |
| 5,104,674 | 4/1992 | Chen et al. | 426/573 |
| 5,106,644 | 4/1992 | El-Nokaly | 426/603 |
| 5,110,612 | 5/1992 | Quarles | 526/573 |
| 5,131,953 | 7/1992 | Kasica | 127/65 |
| 5,137,742 | 8/1992 | Bakal | 426/589 |
| 5,147,665 | 9/1992 | Furcsik | 426/19 |
| 5,192,569 | 3/1993 | McGinley et al. | |

FOREIGN PATENT DOCUMENTS

| | | |
|---|---|---|
| 0052899 | 2/1982 | European Pat. Off. |
| 0237120 | 9/1987 | European Pat. Off. |
| 0298561 | 1/1989 | European Pat. Off. |
| 0327120 | 8/1989 | European Pat. Off. |
| 0327288 | 8/1989 | European Pat. Off. |
| 0340035 | 11/1989 | European Pat. Off. |
| 0367064 | 5/1990 | European Pat. Off. |
| 0372184 | 6/1990 | European Pat. Off. |
| 0387940 | 9/1990 | European Pat. Off. |
| 0420314 | 4/1991 | European Pat. Off. |
| 0420315 | 4/1991 | European Pat. Off. |
| 0427312 | 5/1991 | European Pat. Off. |
| 0430329 | 6/1991 | European Pat. Off. |
| 0443844 | 8/1991 | European Pat. Off. |
| 0470870 | 2/1992 | European Pat. Off. |
| 0480433 | 4/1992 | European Pat. Off. |
| 0486936 | 5/1992 | European Pat. Off. |
| 110957 | 4/1897 | Germany |
| 3-296501 | 12/1991 | Japan |
| 4-46901 | 2/1992 | Japan |
| 2247242 | 2/1992 | United Kingdom |
| 8704465 | 7/1987 | WIPO |
| 8912403 | 12/1989 | WIPO |
| 9000010 | 1/1990 | WIPO |
| WO90/06343 | 6/1990 | WIPO |
| WO90/15147 | 12/1990 | WIPO |
| WO91/01092 | 2/1991 | WIPO |
| 9101091 | 2/1991 | WIPO |
| 9107106 | 5/1991 | WIPO |
| 9112728 | 9/1991 | WIPO |
| WO92/02614 | 2/1992 | WIPO |
| WO92/21703 | 12/1992 | WIPO |

OTHER PUBLICATIONS

R. L. Whistler, et al., *Starch: Chemistry and Technology,* pp. 25–35 (Academic Press, Inc., N.Y., N.Y., 1984).

J. Bouchard, et al., "High-Performance Liquid Chromatographic Monitoring of Carbohydrate Fractions in Partially Hydrolyzed Corn Starch", *J. Agric. Food Chem.,* vol. 36, pp. 1188–1192 (1988).

K. Koizumi, et al., "High-Performance Anion-Exchange Chromatography of Homogeneous D—Gluco-Oligosaccharides and Polysaccharides (Polymerization Degree equal to or greater than 50) with Pulsed Amperometric Detection", *Journal of Chromatography,* 464, pp. 365–373 (1989).

F. Reuther, et al., "Structure of Maltodextrin Gels–A Small Angle X-Ray Scattering Study", *Colloid and Polymer Science,* 261, 271–276 (1983).

S. Nara, et al., "Study on Relative Crystallinity of Moist Potato Starch", *Starke/Starch,* vol. 30, pp. 111–114 (1978).

S. J. Richardson, "Molecular Mobilities of Instant Starch Gels Determined by Oxygen-17 and Carbon-13 Nuclear Magnetic Resonance", *Journal of Food Science,* vol. 53, No. 4, pp. 1175–1180 (1988).

C. Luu, et al., "Model Structure for Liquid Water", *Travaux de la Societe de Pharmacie de Montpellier,* vol. 41, No. 3, pp. 203–212 (1981).

D. C. White and G. N. Lauer, "Predicting Gelatinization Temperatures of Starch/Sweetener Systems for Cake Formulation by Differential Scanning Calorimetry, I. Development of a Model", *Cereal Foods World,* vol. 35, No. 8, pp. 728–731 (Aug. 1990).

C. Orr, "Size Measurement of Particles", *Encyclopedia of Chemical Technology,* vol. 21, pp. 106–162 (Kirk-Othmer, eds., John Wiley & Sons, Inc., N.Y., N.Y., 1983).

D. R. Paul and G. Morel, "Membrane Technology", *Encyclopedia of Chemical Technology,* vol. 15, pp. 92–131 (Kirk-Othmer, eds., John Wiley & Sons, Inc., N.Y., N.Y., 3d ed., 1981).

P. R. Klinkowski, "Ultrafiltration", *Encyclopedia of Chemical Technology,* vol. 23, pp. 439–461 (Kirk-Othmer, eds., John Wiley & Sons, Inc., N.Y., N.Y., 3d ed., 1983).

"Solve Tough Process Filtration Problems with Ceraflo Ceramic Systems", a technical bulletin, Lit. No. SD113, Feb. 1989 89–418, published (1989) by Millipore Corporation, Bedford, Mass.

H. Rueter, "Homogenization", *Encyclopedia of Food Science,* pp. 374–376 (M. S. Peterson and A. H. Johnson, eds., AVI Publ. Co., Westport, Conn., 1978).

L. H. Rees and W. D. Pandolfe, "Homoginizers", *Encyclopedia of Food Engineering,* pp. 467–472 (C. W. Hall, et al., eds., AVI Publ. Co., Westport, Conn., 1986).

W. C. Griffin, "Emulsions", *Encyclopedia of Chemical Technology,* vol. 8, pp. 900–930 (Kirk-Othmer, eds., John Wiley & Sons, Inc., N.Y., N.Y., 3d ed., 1979).

T. H. Applewhite, "Fats and Oils", Encyclopedia of Chemical Technology, vol 9, pp. 795–831 (Kirk-Othmer, eds., John Wiley & Sons, Inc., N.Y., N.Y., 3d ed., 1980).

"Food Labelling; Serving Sizes", 55 Fed. Reg. 29517 (1990).

"Food Labelling; Definitions of the Terms Cholesterol Free, Low Cholesterol, and Reduced Cholesterol", 55 Fed. Reg. 29456 (1990).

R. Matthews, *Legumes; Chemistry, Technology, and Human Nutrition,* pp. 226–229 Marcel Dekker, Inc., N.Y., N.Y., 1989).

O. A. Battista, et al., "Colloidal Macromolecular Phenomena. Part II. Novel Microcrystals of Polymers", *Journal of Applied Polymer Science,* vol. 11, pp. 481–498 (1967).

N. Z. Erdi, et al., "Rheological Characteristics of Polymeric Microcrystal-Gels", *Journal of Colloid and Interface Science,* vol. 28, pp. 36–47.

E. Dickinson, "Particle Gels", *Chemictry & Industry,* pp. 595–599 (Oct. 1990).

"NEPOL Amylose", Market Development Bulletin No. 101, A. E. Staley Mfg. Co. (1962).

O. A. Battista, et al., "Microcrystalline Cellulose", *Industrial and Engineering Chemistry,* vol. 54, pp. 20–29 (1962).

"Avicel RC-581 Technical Bulletin", Bulletin No. RC-11 of FMC Corporation, Marcus Hook, Pa. 11/69-1M.

"Avicel Microcrystalline Cellulose, The Non-Caloric Ingredient", a bulletin of American Viscose Corporation, Marcus Hook, Pa. (later a division of FMC Corporation).

"Avicel RC-591 in Foods", Bulletin No. RC-22, FMC Corporation, Marcus Hook, Pa. (May 1971).

"Avicel RC in Bakery Products", Bulletin No. RC-35, FMC Corporation, Marcus Hook, Pa.

"Avicel RC in Canned Foods", Bulletin No. RC-31, FMC Corporation, Marcus Hook, Pa. (May 1972).

"Avicel Pricing", a bulletin apparently of American Viscose Corporation, Marcus Hook, Pa. (later a division of FMC Corporation).

"C9-112 Microcrystalline Starch", a product bulletin of A. E. Staley Mfg. Co., Decatur, Ill.

A. H. Young, Evaluation of Microcrystals Prepared from MIRA-QUIK C in the Pilot Plant Spray Dried in the Presence of Sodium Carboxymethylcellulose (C9-112)", Project Report No. RD 73-17 of A. E. Staley Mfg. Co.

(List continued on next page.)

OTHER PUBLICATIONS

W. C. Mussulman and J. A. Wagoner, "Electron Microscopy of Unmodified and Acid-Modified Corn Starches", *Cereal Chemistry,* vol. 45, pp. 162–171 (1968).

M. Yamaguchi, et al., "Electron Microscopic Observations of Waxy Maize Starch", *Journal of Ultrastructure Research,* 69, 249–261 (1979).

P. L. Russell, et al., "Characterization of Resistant Starch from Wheat and Maize", *Journal of Cereal Science,* vol. 9, pp. 1–5 (1989).

O. B. Wurzburg, *Modified Starches: Properties and Uses,* pp. 18–23, 38–40, 244–245 and 250–252 (CRC Press, Inc., Boca Raton, Fla. (1986).

"Fat-Sparing Starch Can Replace 100% Fat/Oil for 96% Calorie Reduction", *Food Processing,* p. 38 (Dec. 1990).

W. A. Atwell, et al., "Characterization of Quinoa Starch", *Cereal Chemistry,* vol. 60, pp. 9–11 (1982).

"Staley Formulation of Food Starch-Modified", a new product review presented to the U.S. Food and Drug Administration by A. E. Staley Mfg. Co.

New Generation of Foods with Reduced Fat", *Food Engineering,* pp. 23 and 26 (Jan. 1990).

G. R. Sanderson, "Polysaccharides in Foods", *Food Technology,* pp. 50–57 and 83 (Jul. 1981).

"Gums and Starches Bulk Up Low-Cal Foods", *Food Engineering* (Jan. 1990).

STA-SLIM starches", a technical data sheet published by A. E. Staley Mfg. Co., Decatur, Ill.

Reduced-Oil Salad Dressing", a technical publication of A. E. Staley Mfg. Co., Decatur, Ill.

J. D. Dzierzak, "Membrane Separation Technology Offers Processors Unlimited Potential", *Food Technology,* pp. 108–113 (Sep. 1990).

R. J. Swientek, "Microfluidizing Technology Enhances Emulsion Stability", *Food Processing,* pp. 152–153 (Jun. 1990).

*RANNIE High Pressure Laboratory Homogeniser,* a service manual, Rannie a/s, Roholmsvej 8, DK-2620 Albertslund, Denmark).

R. D. Spies and R. C. Hoseney, "Effect of Sugars on Starch Gelatinization", *Cereal Chemistry,* vol. 59, No. 2, pp. 128–131 (1982).

H. L. Savage, et al., "Effects of Certain Sugars and Sugar Alcohols on the Swelling of Cornstarch Granules", *Cereal Chemistry,* vol. 55, No. 4, pp. 447–454 (1978).

K. Ghiasi, et al., "Effects of Flour Components and Dough Ingredients on Starch Gelatinization", *Cereal Chemistry,* vol. 60, No. 1, pp. 58–61 (1983).

W. J. Stadelman, et al., *Egg and Poultry-Meat Processing,* pp. 52–63 (Ellis Horwood Ltd., Chichester, England, 1988).

N. Krog, "Functions of Emulsifiers in Food Systems", *J. Am. Oil Chemists Society,* vol. 54, pp. 124–133 (1977).

J. D. Dziezak, "Emulsifiers: The Interfacial Key to Emulsion Stability", *Food Technology,* vol. 42, No. 10, pp. 172–186 (1988).

E. M. A. Willhoft, "Recent Developments on the Bread Staling Problem", *The Baker Digest,* pp. 14–20 (Dec. 1973).

W. H. Knightly, "The Evolution of Softeners and Conditioners Used in Baked Foods", *The Bakers Digest,* pp. 64–75 (Oct. 1973).

P. Richards, *Breads, Rolls and Sweet Doughs,* pp. 92–95 (Peacock Business Press, 1973).

Data Base WPIL/Derwent AN-80-66061C (38), Derwent Publications Ltd., London, England, abstract of German Patent DD-A-142646 (H. Richter) (Jul. 10, 1980).

Data Base WPIL/Derwent AN-85-210261 (35), Derwent Publications Ltd., London, England, abstract of German Patent DD-A-161178 (Akad Wissenschaft DDR) (May 2, 1985).

Data Base WPIL/Derwent AN-85-245675 (40), Derwent Publications Ltd., London, England, abstract of Japanese Patent No. JP-A-60160833 (Miyoshi Yushi KK) (Aug. 22, 1985).

J. Jane, et al., "Preparation and Properties of Small Particle Corn Starch", *Cereal Chemistry,* vol. 69, pp. 280–283 (1992).

Tegge, "Produkte der sauren Stärkehydrolyse", Die Stärken, pp. 244–246 (1981), (English translation).

"Low fat ground beef patties", brochure, A. E. Staley Mfg. Co. (Oct. 1991).

"Low fat pork sausage patty", formula sheet CFSF7 196211, A. E. Staley Mfg. Co.

Stellar Fat Replacer, Structure", technical information bulletin, A. E. Staley Mfg. Co., TIB 29 195060 (Jun. 1991).

(List continued on next page.)

OTHER PUBLICATIONS

Stellar Fat Replacer", technical data sheet, A. E. Staley Mfg. Co., TDS 513 192250 (Jun. 1991).

Stellar Fat Replacer, Handling, Storage, and Preparation", technical information bulletin, A. E. Staley Mfg. Co., TIB 28 195060 (Jun. 1991).

Ambler, "Centrifugation", Handbook of Separation Techniques for Chemical Engineers, pp. 4–60 to 4–88 (McGraw Hill 1988).

BeMiller, "Gums", Encyclopedia of Food Science & Technology, vol. 2, pp. 1338–1344 (John Wiley & sons 1992).

Duxbury, "Modified food starches partially replace fats, oils & provide smooth texture", Food Processing, pp. 86–88 (Nov. 1990).

Duxbury, "Pre-hydrated gums eliminate lumping, long hydration times," Food Processing, pp. 44–48 (Jun. 1992).

Falkiewicz, "Avicel in suspensions—dispersion, rheology and colloid science", Soap, Cosmetics, Chemical Specialities, pp. 27–34 (Apr. 1979).

Faulkner et al., "Size reduction", Encyclopedia of Chemical Technology, vol. 21, pp. 132–162 (Kirk Othmer eds., John Wiley & Sons, 1983).

Giese, "Developing low-fat meat products", Food Technology, pp. 100–108 (Apr. 1992).

Jane et al., "Structure studies of amylose-V complexes and retrograded amylose by action of alpha amylases, and a new method for preparing amylodextrins", Carbohydrate Research, vol. 132, pp. 105–118 (1984).

Kerr, Chemistry and Industry of Starch, 2d ed., pp. 564–567 (Academic Press 1950).

Lansky et al., "Properties of the fractions and linear subfractions from various starches", vol. 71, pp. 4066–4075 (1949).

Larsson et al., "Annealing of starch at an intermediate water content", Starch/Starke, vol. 43, No. 6, pp. 227–231 (Jun. 1991).

Lavanchy et al., "Centrifugal separation", Encyclopedia of Chemical Technology, vol. 5, pp. 194–233 (Kirk-Othmer, eds., John Wiley & Sons, 3d ed., 1979).

Manley, Technology of Biscuits, Crackers and Cookies, pp. 335–347 (Ellis Horwood 1983).

Mason, "Chemistry with ultrasound", Critical Reports on Applied Chemistry, vol. 28, pp. 1–26, 91–98, 159–187 (Elsevier Science Publishers 1990).

Matz, Cookie and Cracker Technology, pp. 163–167 (AVI Publishing 1968).

Pancoast et al., Handbook of Sugars, pp. 157–287 (AVI Publishing 1980).

Patterson, Hydrogenation of Fats and Oils, pp. 44–48, 173–182, 291–304 (Applied Science Publishers, 1983).

Pszczola, "Oat-bran-based ingredient blend replaced fat in ground beef and pork sausage", Food Technology, pp. 60–66 (Nov. 1991).

Sievert et al., "Enzyme resistant starch. I. Characterization and evaluation of enzymatic, thermoanalytical, and microscopic methods", Cereal Chemistry, vol. 66, pp. 342–347 (1989).

Stute, "Hydrothermal modification of starches: the difference between annealing and heat/moisture-treatment", Starch/Staerke, vol. 44, pp. 205–214 (1992).

Taki, "Functional ingredient blend products low-fat meat produces to meet consumer expectations", Food Technology, pp. 70–74 (Nov. 1991).

Teot, "Resins, water-soluble", Encyclopedia of Chemical Technology, vol. 20, pp. 207–230 (John Wiley & Sons 1982).

Trout, "Pasteurization", Encyclopedia of Food Science, pp. 600–604 (Peterson et al. eds., AVI Publ. Co., 1978).

Wang, "Meat processing I", Encyclopedia of Food Engineering, pp. 545–557 (AVI Publishing 1986).

Whistler et al., "Effect of acid hydrolysis on the retrogradation of amylose", Cereal Chemistry, vol. 25, No. 6, pp. 418–424 (1948).

COMPOSITION AND METHOD OF PREPARING REDUCED FAT SPREADS

FIELD OF THE INVENTION

This invention relates to food formulations in which at least a portion of the fat and/or oil is replaced by a carbohydrate.

BACKGROUND OF THE INVENTION

U.S. Pat. No. 4,510,166 (Lenchin et al.) discloses converted starches having a DE less than 5 and certain paste and gel characteristics which are used as a fat and/or oil replacement in various foods, including ice cream and mayonnaise. The converted starches are described as dextrins, acid-converted starches (fluidity starches), enzyme-converted starches and oxidized starches. It is also disclosed that if the converted starches are not rendered cold-water soluble by the conversion, they are pregelatinized prior to use or cooked during use.

A product bulletin entitled "Paselli SA2; The Natural Alternative to Fats and Oils" (Avebe b.a., Foxhol, Holland, Ref. No. 05.12.31.167 EF) discloses the use of a low-DE-hydrolysate (DE less than 3) made from potato starch as a replacement for fifty percent of the fat with an amount of the low-DE-potato starch hydrolysate plus water (starch hydrolysate at 28% dry solids) equal to the amount of fat replaced.

U.S. Pat. Nos. 3,962,465 (Richter et al.) and 3,986,890 (Richter et al.) disclose the use of thermoreversible gels of a starch hydrolysate (formed by enzymatic hydrolysis) as a substitute for fat in a variety of foods, including cake creams and fillings, mayonnaise and remoulades, cream cheeses and other cheese preparations, bread spreads, pastes, meat and sausage products, and whipped cream.

The preparation of ready-to-spread frostings having reduced levels of calories is disclosed in U.S. Pat. No. 4,761,292 (Augustine et al.). The patent discloses a frosting which contains (a) about 40 to 85 weight percent sugar, at least about 20 weight percent of which comprises fructose; (b) about 1 to 12 weight percent of a granular starch having a cold-water solubility of greater than 50 weight percent and a fat content of less than 0.25 weight percent; (c) about 5 to 30 weight percent fat; and (d) about 10 to 30 weight percent water. The patent also discloses, at column 5, lines 25–38, that the preferred frostings contain 8 to 18 weight percent fat in comparison to conventional frostings which routinely contain about 18 to 30 weight percent fat.

U.S. Pat. No. 4,536,408 (Morehouse) discloses margarine or butter-like spreads of reduced caloric values which involve an edible fat at levels of from about 15 to 35% by weight of the spread and a low D.E. non-gelling starch hydrolysate having a D.E. value of about 4 and not more than 25. The spreads are described as water-in-oil emulsions.

U.S. Pat. No. 4,917,915 (Cain et al.) discloses spreads containing less than 35 wt. % fat comprising 10–35 wt. % continuous fat phase and 90–65 wt. % dispersed aqueous phase. The aqueous phase contains a gel-forming composition having a viscosity of at least 20 mPA.s when measured at 5° C. and at a shear rate of 17090 $sec^{-1}$. Gelling agents are stated to include gelling hydrolyzed starch derivatives, for example Paselli SA2, which is described as a gelling maltodextrin.

U.S. Pat. No. 4,591,507 (Bodor et al.) discloses edible water-in-oil emulsion spreads having an aqueous phase dispersed in a continuous fat phase and produced by incorporating, as a component of the dispersed phase of the emulsion, hydrated, non-crystalline, intact, undissolved starch particles. The starch is more particularly described as being swollen by the aqueous phase to a sub-maximal degree, thereby avoiding disintegration and ultimately dissolution in the starch in the aqueous phase. The emulsions are described as containing 20–70% by weight fat in the case of spreads of the reduced-fat type.

U.S. Pat. No. 4,587,131 (Bodor et al.) discloses edible water-in-oil emulsion spreads having an aqueous phase dispersed in a continuous fat phase and produced by incorporating, as a component of the dispersed phase of the emulsion, 1–25 wt. % based on the total emulsion, of discrete granules of agglomerates of native, crystalline starch granules, 80–100% of which have a diameter of less than 25 microns, preferably between 4 and 15 microns. The emulsions are described as containing 20–70% by weight fat in the case of spreads of the reduced-fat type.

SUMMARY OF THE INVENTION

This invention relates to a composition of matter useful as a peanut spread comprising a macroscopically homogeneous blend of a peanut component and an aqueous dispersion of a fragmented granular starch hydrolysate comprised of a major amount of cold-water insoluble starch hydrolysate and a minor amount of cold-water soluble hydrolysate, wherein the amount of said fragmented granular starch hydrolysate in said dispersion is sufficient in relation to the amount of water in said aqueous dispersion and any oil in said composition to make said composition non-flowable. The composition can be considered an intimate mixture that is macroscopically homogeneous.

This invention also relates to a method of preparing a composition useful as a peanut spread comprising:

preparing a premix comprising granular starch hydrolysate comprised of a major amount of cold-water insoluble starch hydrolysate and a minor amount of cold-water soluble hydrolysate and the use of the terms "major" and "minor" in context together in this specification is meant to imply that the major component is present in a greater amount by weight than the minor component, and no more nor less should be inferred therefrom unless expressly noted otherwise in context.

DETAILED DESCRIPTION OF THE INVENTION

This invention employs a fragmented granular starch hydrolysate. The granular starch hydrolysate will be capable of forming a particle gel upon fragmentation of the granular starch hydrolysate in an aqueous medium. The preparation of fragmented granular starch hydrolysates useful herein is disclosed in PCT Appln. No. PCT/US91/01029, published Sep. 5, 1991, the disclosure of which is incorporated by reference.

The fragmented, granular starch hydrolysate is made by the sequential acid-hydrolysis and fragmentation of a granular starch material, preferably derived from a starch having a major proportion of amylopectin. Starch is generally comprised of a highly-branched glucan having alpha-1,4 and alpha-1,6 linkages, denominated amylopectin, and a substantially linear glucan, having almost exclusively alpha-1,4 linkages, denominated amylose. Methods of determining the amounts of each are referenced in R. L. Whistler et al., *Starch: Chemistry and Technology,* pp. 25–35 (Academic Press, Inc., New York, N.Y., 1984), the disclosure of which is incorporated by reference. Examples of starches having a major proportion of amylopectin include the common non-mutant starches of cereals and legumes, e.g. corn, wheat, rice, potato and tapioca, and mutant varieties comprised of a major proportion of amylopectin, e.g. waxy maize. Preferred for use herein are common corn starch and waxy maize starch.

As used herein, the term "granular starch" refers to a starch composition in which the native granular structure is retained. Thus, this term, without further limitations, includes common starches and starches isolated from mutant varieties, e.g. waxy maize starch and high amylose corn starch. High amylose corn starch is commercially available in native granular form and having an amylose content within the range of about 50% to about 80%. For example, native granular starches, one with an amylose content of 55% to 60% and the other with about 70%, are available from National Starch and Chemical Corporation, Bridgewater, N.J. HYLON TM and HYLON VII, respectively. The starch should be in the native granular form to be useful as a starting material. This form is resistant to hydration and/or gelatinization during the acid-hydrolysis, and thus, fragments of the starch will retain many of the structural features of the native granule, e.g. the lamellae resulting from the growth pattern of the granule. By "gelatinization temperature" is meant the temperature at which a majority (by weight) of the granular starch starting material is "gelatinized" or "pasted". In other words, a product in which the gelatinization occurs with respect to a minor amount of the granular starch starting material is within the scope of the granular starch hydrolysate, unless otherwise noted.

Various pretreatments of the native granule starting material can be performed so long as the resistance to gelatinization during acid-hydrolysis is preserved. A particularly useful pretreatment is defatting of the granule, e.g. by an alkaline wash as described in U.S. Pat. No. 4,477,480 (Seidel et al.), the disclosure of which is incorporated herein by reference, and/or a solvent extraction as described in U.S. Pat. Nos. 3,717,475 and 3,586,536 (Germino), the disclosure of which are incorporated by reference. The granular starch from which the hydrolysate is made should generally contain less than about 1.5% fatty acids and proteins. Because the hydrolysis is accomplished in a predominantly aqueous medium and is typically washed with only water, the hydrolysis will not remove any substantial portion of the lipids present in the starch. Further, because a substantial portion of the starch is hydrolyzed to products soluble in the aqueous medium and subsequent wash water, the hydrolysis and washing will remove starch solids and, thus, result in a lipid content on a weight percentage basis that is higher for the hydrolysate than the parent starch.

The acid-hydrolysis of the granular starch is performed to permit mechanical disintegration of the granular starch hydrolysate residue to a degree that will allow the formation of an aqueous dispersion that is salve-like. The hydrolysate will be capable upon mechanical disintegration of forming an aqueous dispersion (at about 20% hydrolysate solids) having a yield stress of from about 100 to about 1,500 pascals (for example, from about 200 to about 800 pascals or from about 200 to about 600 pascals), but more preferably from about 400 to about 1,500 pascals, and most preferably at least about 500 pascals.

The yield stress of an aqueous dispersion of fragmented starch hydrolysate has been found to correlate well with the fat-like consistency of the aqueous dispersion. In other words, if the yield stress is in an appropriate range, the aqueous dispersion will generally exhibit a fat-like consistency. However, yield stress may not correlate well with properties other than consistency. For example, a sample with an appropriate yield stress may exhibit a gritty mouthfeel (i.e. grittiness) due to aggregation of the insoluble hydrolysate particles (e.g. as a result of freeze-thaw of an aqueous dispersion of fragmented starch hydrolysate). Further, the correlation between yield stress and fat-like consistency may not hold in the converse for all fragmented starch hydrolysates described herein. In other words, a particular fragmented starch hydrolysate may exhibit a fat-like consistency under some conditions, but not exhibit an appropriate yield stress. In sum, while yield stress exhibits a useful correlation with fat-like consistency, yield stress is not believed to be a perfect predictor of fat mimicking properties of a fragmented starch hydrolysate.

An aqueous dispersion of fragmented granular starch hydrolysate should exhibit rheological properties characteristic of a particle gel. One measure of these properties is provided by measuring the dynamic elastic modulus (G') over a range of shear strain. A particle gel will exhibit a transition in G' versus shear strain from a substantially constant G' to a decreasing G' as shear strain increases. The transition indicates fracture of the particle network within the particle gel and is typically a sharp transition at a relatively low (compared to a polymer gel) shear strain. The particle gels useful herein will typically exhibit such a transition at less than about 50 millistrain, and preferably less than about 20 millistrain.

In general, the starch hydrolysate will have a peak molecular weight as measured by gel permeation chromatography of from about 2,000 g/mol to about 10,000 g/mol, preferably from about 3,500 g/mol to about 5,000 g/mol and more preferably from about 4,500 g/mol to about 5,000 g/mol.

It has been found that the weight average molecular weight ($M_w$) as measured by gel permeation chromatography exhibits a better correlation (better than PMW) to the yield stress of an aqueous dispersion of the fragmented starch hydrolysate. The $M_w$ should generally range from about 3,000 to about 12,000, preferably about 4,000 to about 7,500 and more preferably 4,500 to about 6,500. Of course, $M_w$ also correlates to peak molecular weight, but some factors (e.g. the efficiency of washing of the product centrifuge cake which can affect the cold-water solubles content of the product) can affect the degree of correlation between $M_w$ and peak molecular weight from lot to lot of a given production run. Molecular weights of starch hydrolysates can be measured by the procedure described by J. Bouchard et al., "High-Performance Liquid Chromatographic Monitoring of Carbohydrate Fractions in Partially Hydrolyzed Corn Starch", *J. Agric. Food Chem.*, vol. 36, pp. 1188–1192 (1988), the disclosure of which is incorporated herein by reference.

The Dextrose Equivalent (by Lane-Eynon method DE) of the starch hydrolysate will vary based on the precise degree of hydrolysis and the efficiency of the washing of the starch hydrolysate, but will typically be greater than about 3, more typically greater than about 5, e.g. from about 5.0 to 7.0.

With an amylopectin based material, the fragmented granular starch hydrolysate will exhibit a bimaximal profile of oligomers of varying degree of polymerization with (i) a maximum in proximity to a degree of polymerization of about 13, and (ii) a maximum in proximity to a degree of polymerization of about 26. (A profile of the oligomeric composition of a starch hydrolysate (the "oligomer profile") can be obtained by the method described by K. Kiozumi, et al., "High-Performance Anion-Exchange Chromatography of Homogeneous D-Gluco-Oligosaccharides and -Polysaccharides (Polymerization Degree equal to or greater than 50) With Pulsed Amperometric Detection", *Journal of Chromatography,* 46, pp. 365–373 (1989), the disclosure of which is incorporated by reference herein.)

The starch hydrolysates, and fragmented disperisons thereof, can be analyzed by a variety of techniques. For example, low angle (or "small angle") X-ray scattering experiments can be performed on an aqueous dispersion of a fragmented starch hydrolysate and the results (particularly those in the Porod region of the spectrum) may show an ordering (or lack thereof) in the dispersion in the range of tens to hundreds of angstroms. Such low-angle X-ray scattering techniques are described in F. Reuther, et al., "Structure of Maltodextrin Gels—A Small Angle X-Ray Scattering Study", *Colloid and Polymer Science,* 261, 271–276 (1983), the disclosure of which is incorporated by reference. Further, wide angle X-ray scattering techniques (e.g. those described by S. Nara, et al., "Study on Relative Crystallinity of Moist Potato Starch", *Starke/Starch,* vol. 30, pp. 111–114 (1978)) can be performed on the starting starch, the starch hydrolysate powder and on the aqueous dispersion of fragmented starch hydrolysate to examine the effects of hydrolysis and/or fragmentation on the ordering of the starch material in the range of about 1–15 angstroms, i.e. ordering related to the distances between atoms in the starch material.

Nuclear magnetic resonance techniques (e.g. those described by S. Richardson, "Molecular Mobilities of Instant Starch Gels Determined by Oxygen-17 and Carbon-13 Nuclear Magnetic Resonance", *Journal of Food Science,* vol. 53, No. 4, pp. 1175–1180 (1988)) can be used to show the electronic environment of atomic nuclei in the starch hydrolysate, e.g. $C^{13}$ and thus give information relating to molecular structure and disposition (e.g. carbohydrate ring conformations, Vander Waals bonding, etc.). The technique of measuring water mobility (or immobility, its inverse) by oxygen-17 NMR may be supplemented with Raman infra-red spectroscopy techniques in the "water-band" of the infra-red portion of the spectrum (e.g. techniques such as those described by C. Lun, et al., "Model Structure for Liquid Water", *Travaux de la Societe de Pharmacie de Montpellier,* vol. 41, No. 3, pp. 203–212 (1981), the disclosure of which is incorporated herein by reference). Differential Scanning Calorimetry (DSC) can be employed to examine the solubility of the starch hydrolysate in water (before and/or after fragmentation) over various temperatures. Such DSC techniques are described, for example, by D. C. White and G. N. Lauer, "Predicting Gelatinization Temperatures of Starch/Sweetener Systems for Cake Formulation by Differential Scanning Calorimetry. I. Development of a Model", *Cereal Foods World,* vol. 35, No. 8, pp. 728–731 (August 1990), the disclosure of which is incorporated by reference.

It should also be noted that the mean particle size of the starch hydrolysate, before and after fragmentation, can be measured by a variety of different means. However, the utility of such information must be considered carefully in view of the considerations noted by C. Orr, "Particle Size Measurement", *Encyclopedia of Chemical Technology,* vol. 21, pp. 106–131 (Kirk-Othmer, eds., John Wiley & Sons, Inc., New York, N.Y., 1983), the disclosure of which is incorporated by reference. With this caveat in mind, it should be mentioned that the means particle size, as measured by certain techniques, of the starch hydrolysate may appear to be substantially the same, e.g. about 10 microns (by light scattering techniques). However, when the aqueous dispersion of fragmented starch hydrolysate is analyzed to determine the surface area of the fragments, a mean particle size on the order of 50 angstroms to 200 angstroms may be inferred therefrom. Without wishing to be bound by any particular theory, unless otherwise noted, this particle size information suggests that the aqueous dispersion of fragmented starch hydrolysate contains agglomerates of fragments, such agglomerates being on the order of 10 microns in size and being comprised of individual fragments on the order of 50–200 angstroms. Further, it may be theorized that the agglomerates are malleable in the dispersion such that they deform (and perhaps undergo inter-agglomerate exchange of fragments) in a manner that imparts the property of plasticity to the dispersion. This plasticity may then give rise to the fat-like or salve-like consistency of the dispersion. This theory may also account for the fat-like mouth-clearing of the dispersion observed in many foods, e.g. frozen desserts. However, it should again be noted that these theories must be considered as such, unless otherwise expressly noted herein.

The acid hydrolysis can be accomplished in an essentially aqueous slurry of the starch. Typical conditions will include a starch slurry at 30% to 40% starch solids in 0.25N to 2.5N mineral acid (e.g. hydrochloric acid or sulfuric acid) maintained at a temperature of from about 50° C. to about 70° C., preferably from about 55° C. to about 60° C., more preferably from about 57° C. to about 62° C., for from about 8 to about 20 hours, preferably from about 10 to about 16 hours, when the acid is about 1N (and from about 8 to about 48 hours, preferably from about 20 to about 30 hours when the acid is about 0.5N). Variations within and around the scope of these parameters to optimize a particular set of conditions in conjunction with the means and degree of mechanical disintegration described below will be within the skill of the art given the examples set forth below.

It is believed that the moderate temperatures employed will reduce the amounts of reversion products produced during hydrolysis. Because reversion products tend to contribute off-flavors to the hydrolysate, minimizing their production should enhance the organoleptic acceptability of the hydrolysate by ensuring the production of a hydrolysate with a desirably bland taste. Likewise, the moderate reaction times will reduce opportunity for the development of rancidity in the hydrolysate that may occur over longer reaction times, e.g. more than a few days, as a result of the breakdown of even small amounts of residual lipids.

The hydrolysis medium is essentially aqueous. Generally, it will contain no more than a trace, if any, of organic solvents (e.g. ethanol). Organic solvents may react with the saccharide by-products (e.g. dextrose to form at least traces of ethyl glucoside), may otherwise affect the hydrolysis reaction (e.g. solvent effects) and/or may contaminate the starch hydrolysate product.

The progress of the hydrolysis may be followed by taking small samples of slurry from an in-progress batch of the starch hydrolysate, adjusting the pH of the slurry (e.g. to 4–5), isolating the solid starch hydrolysate residue from the slurry sample, and mechanically disintegrating the residue under the conditions intended for the batch as a whole. The yield stress of a 20% aqueous dispersion can then be measured to determine if the acid-hydrolysis has progressed to a desired degree. Also, samples of insoluble residue can be isolated for a determination of peak molecular weight (or weight average molecular weight) by gel permeation chromatography or of supernatant for dextrose content and the results used as a measure of the degree of hydrolysis; both molecular weight (particularly $M_w$) and dextrose content have been found to correlate well with yield stress of the resulting starch hydrolysate upon fragmentation, as discussed below.

It has been found that there is very little, if any, change in the degree of branching of the glucan chains of the starch as a result of the acid hydrolysis. Thus, the ratio of 1,4 linkages to 1,6 linkages in the hydrolysate will generally be substantially the same as that of the starting amylopectin starch. Given the typical degree of branching of amylopectin and amylose, a starch comprised of a major proportion of amylopectin (i.e. greater than 50% by weight of the dry solids of the starch is glucan in the form of amylopectin) will exhibit a ratio of alpha-1,4 linkages to alpha-1,6 linkages of less than about 40:1. Thus, the starch hydrolysates will generally have a ratio of alpha-1,4 linkages to alpha-1,6 linkages of less than about 40:1, typically, from about 20:1 to about 40:1.

It has also been found that the crystalline form of the parent starch, as determined by X-ray diffraction, is retained without substantially change, although the relative crystallinity of the starch hydrolysate is generally greater than the parent starch. Thus, native waxy maize and native common corn starch (both of which are substantially free of the "B" type crystalline form) will generally yield hydrolysates that are substantially free of the "B" type as determined by X-ray diffraction.

The fragmented starch hydrolysate may also be otherwise chemically modified. Examples of such chemical modification include the product of reaction with bleaching agents (e.g. hydrogen peroxide, peracetic acid, ammonium persulfate, chlorine (e.g. calcium and/or sodium hypochlorite or sodium chlorite), and permanganate (e.g. potassium permanganate); esterifying agents (e.g. acetic anhydride, adipic anhydride, octenyl succinic anhydrides, succinic anhydride, vinyl acetate); including phosphorous compounds (e.g. monosodium orthophosphate, phosphorous oxychloride, sodium tripolyphosphate, and sodium trimetaphosphate); and/or etherifying agents (e.g. acrolein, epichlorohydrin, and/or propylene oxide). Such chemical modifications will typically be accomplished after the acid hydrolysis step, but may be accomplished prior to the acid hydrolysis or effected by using a modified starch as a starting material for the acid hydrolysis step. Even esterified starches (e.g. starch modified with octenyl succinic anhydride) can be used as starting material and significant ester functionality will be retained.

The starch hydrolysis product of the slurry is isolated as the solid phase residue by separation thereof from the aqueous phase of the slurry. Techniques for such isolation include filtration (e.g. horizontal belt filtering), centrifugation (e.g. disk, decanter or solid bowl), sedimentation, and other suitable dewatering operations. It should also be noted that the efficiency of the separation of the insoluble starch hydrolysate residue from the aqueous liquid phase of the hydrolysate slurry and the degree of washing of the residue will affect the relative amounts of cold-water insoluble hydrolysate and cold-water soluble hydrolysate in the residue. However, it appears that the residue is relatively resistant to washing in the sense that relatively large amounts of cold-water solubles remain after washing (by simple reslurrying and recentrifugation at ambient temperatures). Thus, while the washing of the residue will affect the amount of cold-water soluble hydrolysate, conventional washing appears to have a surprisingly small effect.

The acid in the slurry can be neutralized either before or after isolation of the hydrolysate. However, it has been found particularly adventageous (in terms of obtaining a desirably bland flavor for the hydrolysate) to (i) only partially neutralize the slurry to a weakly acidic pH (e.g. from about 2.0 to about 3.5) and (ii) then hold the slurry at a moderately elevated temperature (e.g. 25° C. to 75° C.) for a short period of time (e.g. 15 minutes to 24 hours), prior to isolation, followed by washing and then neutralization of the solid hydrolysate residue to a substantially neutral pH (e.g. about 4.5 to about 5.0). This acid washing of the starch hydrolysate is particularly advantageous when employed in the context of microfiltration of the starch hydrolysate slurry using a ceramic microfiltration membrane contained within an acid resistant (e.g. polyvinyl chloride) housing.

It has been found that microfiltration is an effective means of separating an insoluble starch hydrolysate residue from an aqueous slurry thereof which also contains a relatively large amount of dissolved species, e.g. salt and saccharides. Microfiltration is described generally in D. R. Paul and C. Morel, "Membrane Technology", *Encyclopedia of Chemical Technology*, vol. 15, pp. 92–131 (Kirk–Othmer, eds., John Wiley & Sons, New York, N.Y., 3d, ed., 1981), the disclosure of which is incorporated herein by reference.

Typically, a liquid including small dissolved molecules is forced through a porous membrane. Large dissolved molecules, colloids and suspended solids that cannot pass through the pores are retained. Components retained by the membrane are collectively referred to as a concentrate or retentate. Components which traverse the membrane are referred to collectively as filtrate or permeate. Diafiltration is a microfiltration process in which the retentate is further purified or the permeable solids are extracted further by the addition of water to the retentate. This process is analagous to washing of a conventional filter cake. The use of microfiltration removes salts formed by the neutralization of the alkaline solution and other small molecular species.

Ultrafiltration is generally described and discussed by P. R. Klinkowski, "Ultrafiltration", *Encyclopedia of Chemical Technology*, vol. 23, pp. 439–461 (Kirk-Othmer, eds., John Wiley & Sons, New York, N.Y., 3d ed., 1983), the disclosure of which is incorporated by reference herein. Ultrafiltration is a pressure-driven filtration on a molecular scale. The porous membrane typically has a pore size ranging from 0.005 to 20 micrometers (or microns). While a distinction is often made in the separation art between ultrafiltration (pore size range of 2 to 20 nanometers) and microfiltration (pore size greater than 20 nanometers), the terms will be used interchangeably herein unless expressly noted otherwise.

By "microporous ceramic membrane" is meant any ceramic layer (including "supported layer articles") having micropores and sufficient structural integrity to withstand the pressure needed to isolate the insoluble starch hydrolysate residue from the liquid phase of the aqueous slurry over a desired period of time (e.g. from 15 minutes to 24 hours). It is believed that the high pressure used to isolate the insoluble starch hydrolysate residue creates turbulent flow at the membrane's surface which prevents small particles in the slurry from "blinding off" the pores of the membranes (as has been observed with conventional filtration equipment as discussed below).

A typical microporous ceramic membrane is comprised of a microporous ceramic article having at least one macroscopic passage therethrough (typically a cylindrical article having cylindrical passages) substantially parallel to the axis of symmetry of the cylindrical article. While the article may be "microporous" itself, the ceramic cylinder may act principally as a support (i.e. in a "supported layer article") for a microporous layer (or layers with regard to multi-passage articles) which covers the surfaces defined by the passages through the ceramic article. The porosity of the ceramic article, and any microporous layer associated therewith as described above, can be varied as desired with the pore size of any such layer being smaller than that of the article. In typical operation, such a ceramic filter element (i.e. cylindrical and microporous ceramic article) is contained in hollow cylindrical housing and slurry is fed into the passages under pressure through a feed manifold that prevents leakage into the housing. The exit of the isolated starch hydrolysate residue from the passages at the other end of the ceramic filter element is controlled by an exit manifold which also prevents leakage into the housing where the filtrate or permeate is contained. Ceramic filter elements and their use are described in "Solve Tough Process Filtration Problems with Ceraflo Ceramic Systems", a technical bulletin, Lit. No. SD113, 2/89 89-418, published (1989) by Millipore Corporation, Bedford, Mass., the disclosure of which is incorporated by reference.

The isolated starch hydrolysate is typically washed and then dried (e.g. to a low moisture content, typically 3–8%) after isolation to allow for handling and storage prior to further processing. Examples of drying techniques include spray drying, flash drying, tray drying, belt drying, and sonic drying. The dried hydrolysate may be hygroscopic, given the presence of the cold-water soluble hydrolysate therein. Thus, some rehydration during handling and storage may occur. Depending upon the precise composition of the hydrolysate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20%, or possibly greater than 15%), bulk handling problems and/or microbiological stability problems might arise.

A granular starch hydrolysate useful in the practice of this invention is commercially available from the A. E. Staley Manufacturing Company, Decatur, Ill., as STELLAR TM fat replacer.

In certain embodiments, this invention relates to a dry granular starch hydroysate composition consisting essentially of a major amount by weight of cold-water insoluble hydrolysate and a minor amount by weight of cold-water soluble hydrolysate, said dry, granular starch hydrolysate having (a) a weight average molecular weight of from about 4,000 g/mol to about 7,500 g/mol, (b) a bland organoleptic character, and (c) an essentially dry moisture content.

It has been found that the preferred hydrolysis process results in a granular starch hydrolysate composition that is particularly advantageous because of (i) the relative amounts of hydrolysate insolubles and hydrolysate solubles, (ii) weight average molecular weight, (iii) the bland organoleptic character of the granular starch hydrolysate, and (iv) edibility. This combination of properties is important to the use of the hydrolysate as a food ingredient, especially as a fat mimicking ingredient in foods. An essentially dry moisture content is important with respect to the edibility of the composition, e.g., the ability to handle and process the composition into a food product and the microbiological stability of the composition on storage thereof. The composition consists essentially of the major and minor amounts of hydrolysates of different solubility in the sense that it is essentially free of organic solvents and reaction products thereof with hydrolysate components (e.g. ethanol and ethyl glucosides).

In certain embodiments, this invention employs a composition of matter comprising (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of a cold-water soluble hydrolysate, and (ii) a minor amount of salt selected from the group consisting of alkali metal chlorides, alkali metal sulfates, alkaline earth metal chlorides, alkaline earth metal sulfates, and mixtures of two or more thereof, said salt being present in an amount sufficient to produce an organoleptically fat-like aqueous dispersion upon fragmentation of said composition in an essentially aqueous medium at about 20% dry solids of said starch hydrolysate. Typically, said salt is present in an amount of at least 0.1% basis dry weight of said granular starch hydrolysate, preferably at least about 1%, and more preferably about 1% to about 3%.

In certain embodiments, this invention employs a composition of matter comprising a major amount by weight of a granular starch hydrolysate having a weight average molecular weight of less than about 12,000 g/mol and being comprised of a controlled amount of salt present in an amount sufficient to enhance the fat-like characteristics of the composition upon shearing in an aqueous medium, said salt selected from the group consisting of alkali metal chlorides, alkali metal sulfates, alkaline earth metal chlorides, alkaline earth metal sulfates, and mixtures thereof.

In another aspect, this invention employs a composition of matter comprising (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of cold-water soluble hydrolysate, and (ii) a carbohydrate saccharide (in addition to said cold-water soluble hydrolysate) in an amount effective (e.g. a comparable amount by weight, see below) in relation to the amount of said fragmented granular starch hydrolysate and said water to enhance the fat-like properties of said dispersion following either freezing or heating to a temperature of about 72° C.

In another aspect, this invention employs an aqueous dispersion useful as a replacement for fats and/or oils comprising a major amount by weight of water and a minor amount by weight of a fragmented granular starch hydrolysate, said fragmented granular starch hydrolysate being (i) comprised of a major amount by weight of cold-water insoluble hydrolysate material and a minor amount by weight fo cold-water soluble hydrolysate material and (ii) capable of imparting to said dispersion at about 20% solids a yield stress of from about 100 to about 1,500 pascals.

It is believed that the cold-water soluble hydrolysate material improves the water immobilization capability of such cold-water insoluble hydrolysate material, as compared to an aqueous dispersion containing only cold-water insoluble material at the same level of cold-water insoluble material solids. In general, the "minor amount" will be a significant amount in terms of its effect on the properties of the composition, e.g. the ratio of cold-water insoluble to cold-water soluble will be no greater than about 9:1, typically less than about 5:1, and preferably from about 3.0:1 to about 4.0:1. It is also believed that the cold-water soluble hydrolysate material improves the water immobilization capability of such cold-water insoluble hydrolysate material, as compared to aqueous dispersion containing only cold-water insoluble material at the same level of cold-water insoluble material solids.

Following acid-hydrolysis (and neutralization of the slurry), the granular starch hydrolysate is subjected to a physical fragmentation as by mechanical disintegration, i.e. fragmented. As used herein, "fragmented" means that a majority of the starch graunules have been so fragmented that they no longer exhibit, under microscopic examination, the macro-organization of the granule, e.g. the shape characteristic of that variety of granule. Generally, the concentric shells of material that are observed in the granule after the hydrolysis are not observed in a majority of the granules after fragmentation. However, the native crystallites present in the granule are retained (as confirmed by X-ray diffraction of the salves).

The mechanical disintegration of the hydrolysate may be carried out in several ways, as by subjecting it to attrition in a mill, or to a high speed shearing action, or to the action of high pressures. Disintegration is generally carried out in the presence of a major amount by weight of a liquid medium, preferably water. Although tap water is the preferred liquid medium for the dispersion of fragmented starch hydrolysate, other liquids are suitable provided sufficient water is present to hydrate the fragmented starch hydrolysate and, thus, result in a dispersion having a suitable yield stress. Sugar solutions, polyols, of which glycerol is an example, alcohols, particularly ethanol, isopropanol, and the like, are good examples of suitable liquids that can be in admixture with water in the liquid medium. It may also be convenient to fragment the starch hydrolysate in a non-hydrating medium (e.g. 95% ethanol), then solvent exchange with water, and finally redisperse the fragmented starch hydrolysate to form an aqueous dispersion. Typically, however, the starch hydrolysate will be physically fragmented in potable water. Thus, this invention relates to a method of making an aqueous dispersion useful as a replacement for fats and/or oils comprising physically fragmenting a minor amount by weight of an amylopectin starch hydrolysate in the presence of a major amount by weight of a liquid consisting essentially of water, said physically fragmenting being effective to yield an aqueous dispersion having a yield stress of from about 100 pascals to about 1,500 pascals.

The mechanical disintegration is preferably accomplished by subjecting an aqueous dispersion of the hydrolysate to high shear, e.g. in a Waring blender or a homogenizer such as that disclosed in U.S. Pat. No. 4,533,254 (Cook et al.) and commercially available as a "MICROFLUIDIZER" from Microfluidics Corporation, Newton, Mass., or a homogenizer such as the RANNIE TM high pressure laboratory homogenizer, Model Mini-lab, type 8.30 H, APV Rannie, Minneapolis, Minn. Other suitable homogenizers include the model M3-10TBS from APV Gaulin, Arlington Heights, Ill. In general, the performance of homogenizers of the colloid mill type is improved by using a relatively low flow rate with back pressure with temperature at 55°-65° C. Other suitable devices, which provide mechanical shear, include continuous mixers, e.g. model 4M1H15A, from E. T. Oakes Corp., Islip, New York, and batch mixers, e.g. Breddo Likiwifier model LORWWSS-200, from American Ingredients, Kansas City, Mo.

The temperature of the starch hydrolysate must be maintained below the gelatinization (i.e. solubilization) temperature of the hydrolysate. Thus, it may be necessary to cool the hydrolysate during disintegration. For example, when shearing starch hydrolysate derived from waxy maize starch, the temperature of the aqueous dispersion is typically maintained between about 55° C. and about 65° C. Whatever method is used, the disintegration is carried out to such an extent that the resulting finely-divided product is characterized by its ability to form a salve-like suspension in the liquid medium in which it is attrited or in which it is subsequently dispersed. By a salve-like suspension or dispersion is meant one which will exhibit, at about 20% hydrolysate solids, a yield stress of at least about 100 pascals, typically from about 100 pascals to about 2,000 pascals.

It should be noted that it has been found that an aqueous dispersion of the hydrolysate generally exhibits an increase in viscosity over a period of hours following the mechanical disintegration. Thus, the yield stress values herein denote the yield stress about three hours after mechanical disintegration unless otherwise noted. It should also be noted that mechanical disintegration may be sufficient to produce an aqueous dispersion having the desired yield stress, but still leaves a sufficient number of particles of sufficient size to exhibit a "particulate" or "chalky" mouthfeel when ingested. Such chalkiness can be reduced by reducing the particle size of the starch hydrolysate before, during or after mechanical disintegration so that substantially all (typically at least about 95%, preferably at least 99%) of the hydrolysate will pass a U.S. #400 mesh sieve (i.e. substantially all particles are less than 15 microns). An example of a milling device suitable for such size reduction is a TROST TM Air Impact Mill from Garlock, Inc., Newton, Pa.

In general, the fragmented granular starch hydrolysate is incorporated into the food as an aqueous dispersion, typically comprised of a major amount (i.e. greater than 50% by weight) of water or other liquid medium and a minor amount (i.e. less than 50% by weight, typically 10% to 40%) of starch hydrolysate solids. Thus, this invention relates to an aqueous dispersion useful as a replacement for fats and/or oils comprising a major amount by weight of water and a minor amount by weight of a fragmented granular starch hydrolysate, said fragmented granular starch hydrolysate being capable of imparting to said dispersion at about 20% solids a yield stress of from about 100 to about 1,500 pascals. Alternatively, the isolated hydrolysis product can be mixed with the food along with water and then subjected to disintegration in those instances when the other ingredients of the food are capable of withstanding the condition of disintegration, e.g. a salad dressing or imitation sour cream.

It is contemplated that commercial production and use may involve hydrolysis, mechanical disintegration and drying (e.g. spray drying) of the fragmented starch hydrolysate to produce an item of commerce. This item of commerce will then be purchased by a food processor for use as an ingredient. To incorporate the dried, fragmented granular starch hydrolysate into a food product, it may be useful and/or necessary to further mechanically disintegrate the starch hydrolysate while dispersing it into the foodstuff in which it will be employed. However, the technique employed for such mechanical disintegration should not need to be nearly as vigorous as the original mechanical disintegration prior to drying.

The fragmented, amylopectin starch hydrolysate, as well as other granular starch hydrolysates within the scope of this disclosure, should not be subjected to conditions (e.g. elevated temperatures) which will cause the hydrolysate fragments (i.e. a majority by weight thereof) to dissolve. Thus, if the food formulation is to be cooked or otherwise heated, to temperatures sufficient to gelatinize (i.e. dissolve) the hydrolysate, such heating should be completed prior to the addition of the hydrolysate to the food. It should be noted, however, that in many foods that are heated, e.g. pastuerized, the duration of the elevation of temperature may be insufficient to dissolve the starch hydrolysate fragments.

It has further been found that the use of a homogenizer as disclosed in U.S. Pat. No. 4,533,254 is facilitated by the addition of a small amount (e.g. 5% by weight of the starch hydrolysate dry solids) of an emulsifier to the aqueous slurry of starch hydrolysate fed to the homogenizer. When relatively high solids slurries of starch hydrolysate are fed into the homogenizer without added emulsifier, the homogenizer tends to plug after extended operation. The addition of emulsifier (for example, a mixture of mono- and di-fatty acid glycerides, e.g. DUR-LO TM emulsifier from Van den Bergh Foods) prevents this plugging of the homogenizer. Other emulsifiers include polyglycerol esters, polysorbates, ethoxylated monoglycerides, sorbitan monostearate, lactylated esters, and lecithin. Homogenizers useful in forming suspensions or emulsions are described generally by H. Reuter, "Homogenization", *Encyclopedia of Food Science,* pp. 374–376, (M. S. Peterson and A. H. Johnson, eds., AVI Publ. Co., Westport, Conn., 1978), L. H. Rees and W. D. Pandolfe, "Homogenizers", *Encyclopedia of Food Engineering,* pp. 467–472 (C. W. Hall et al., eds., AVI Publ. Co., Westport, Conn., 1986), and W. C. Griffin, "Emulsions", *Encyclopedia of Chemical Technology,* vol. 8, pp. 900–930 (Kirk-Othmer eds., John Wiley & Sons, New York, N.Y., 3d ed., 1979), the disclosures of which are incorporated herein by reference.

The use of the fragmented, amylopectin starch hydrolysate allows for the replacement of a substantial portion (e.g. from 10% to 100% by weight) of the fat and/or oil in a peanut spread formulation, preferably more than about 50%, which for a conventional peanut butter at about 60% fat translates to a fat content of less than about 30% by weight. The precise level of replacement that is possible without adversely affecting the organoleptic characteristics of the spread will vary based upon the characteristics desired of the peanut spread.

The term "fats and/or oils" is intended to broadly cover edible lipids in general, specifically the fatty triglycerides commonly found in foods. The terms thus include solid fats, plastics shortenings, fluid oils, and the like. Common fatty triglycerides include cottonseed oil, soybean oil, corn oil, peanut oil, canola oil, seasame oil, palm oil, palm kernel oil, menhaden oil, whale oil, lard, and tallow. The technology of fats and/or oils is described generally by T. H. Applewhite, "Fats and Fatty Oils", *Encyclopedia of Chemical Technology,* vol. 9, pp. 795–831 (Kirk-Othmer, eds., John Wiley & Sons, New York, N.Y. 3d ed., 1980), the disclosure of which is incorporated by reference.

Generally, it will be desirable to remove sufficient fat from a given formulation to achieve a reduction in calories of at least one-third per customary serving or make a label claim of "cholesterol-free". (In this regard, see, for example, the list of standard serving sizes for various foods published in Food Labelling; Serving Sizes, 55 Fed. Reg. 29517 (1990) (to be codified at 21 C.F.R. 101.12), the disclosure of which is incorporated herein by reference, and the restrictions on labelling "cholesterol-free" at Food Labelling; Definitions of the Terms Cholesterol Free, Low Cholesterol and Reduced Cholesterol, 55 Fed. Reg. 29456 (1990). It should also be noted that the fat removed from a particular formulation may be replaced with an equal amount by weight of an aqueous dispersion of fragmented starch hydrolysate, but that such equality may not be necessary or desirable in all instances. Further, it may be desirable to remove fat and add another ingredient (e.g. a gum, polydextrose, a protein, etc.) along with the aqueous dispersion of starch hydrolysate.

While this invention is generally directed to the replacement of fat and/or oil in a food formulation, it is of course within the contemplation of this invention that a fragmented granular amylopectin starch hydrolysate will be used in an entirely new formulation to which is contributes fat-like organoleptic qualities but is not, in the strictest sense, replacing a pre-existing fat or oil ingredient. Moreover, it is contemplated that the fragmented granular amylopectin starch hydrolysate will have utility as a thickener, bodying agent, or the like in foods that normally do not have a significant fat or oil component. Further, it is contemplated that the combined use of fragmented granular amylopectin starch with fragmented, granular amylose starch (e.g. as a blend) may have certain advantages in many of the compositions described herein. For example, the amylopectin based material may promote a unique consistency while the amylose based material provides greater heat stability to the blend.

This invention relates to peanut spreads having an aqueous phase which contains the fragmented granular starch hydrolysate described above. As discussed above, the granular starch hydrolysate can be fragmented in an aqueous medium and then mixed with the peanut component of the spread or the granular starch hydrolysate is fragmented as part of a premix with the peanut component that is employed in the peanut spread.

The peanut spreads of this invention are, thus, a blend of a peanut component and a fragmented granular starch hydrolysate. As discussed above, the fragmented granular starch hydrolysate is dispersed in an aqueous phase. The peanut spreads are prepared by blending the peanut component and the granular starch hydrolysate. In general, the blend will be prepared by simple mixing of the aqueous dispersion of the fragmented granular starch hydrolysate.

The peanut spread will contain a peanut component. By peanut component is meant a material derived from peanuts which will serve to give the composition a flavor characteristic of peanut spreads. Examples of peanut components include conventional peanut butter, ground peanuts, peanut meal, peanut flour, defatted peanut flour, and the like.

Peanuts, peanut fragments, and ground, roasted and/or blanched peanuts are articles of commerce and are commonly available commodity products. A preferred peanut ingredient is ground roasted peanuts, and a most preferred peanut ingredient is ground roasted blanched peanuts for reasons of optimal flavor, texture and appearance. All of these products may be used with essentially all of their peanut oil. Peanuts generally comprise about 0–50% peanut oil and about 50–60% proteinaceous peanut solids including about 20–35% protein. Ground roasted peanuts without peanut skins generally contain about 40–60% fats, about 20–35% protein, about 0.5–5% water, about 1–4% ash, and about 15–20% carbohydrates including about 1–4% of the total fiber. Preferred ground roasted peanuts contain 50.2% fat, 27.3% protein, 18.2% carbohydrates, 2.4% ash, and 1.8% water. It is possible to make the equivalent of the ground peanuts used in the present invention by adding oil to extracted peanut meal or proteinaceous peanut solids, but it is thought that this can result in substantial flavor loss and is not, therefore, a preferred ingredient for incorporation in the composition of the present invention, although it is provided for, and is within the scope of the present invention.

The peanut compositions of the present invention may be made using edible proteinaceous plant solids from other plant materials, preferably nuts or legumes, as substitutes for the proteinaceous peanut solids from peanuts. Furthermore, various fats or lipid materials from various sources, including natural and synthetic edible fatty materials may be substituted for peanut oils which are inherent in ground peanuts. Edible fats or fatty materials are preferably derived from flower seeds, such as sesame seeds, safflower seeds, sunflower seeds and the like, nuts and legumes. Decorticated (dehulled) toasted sesame seeds having less than about 2% moisture content generally contain about 45–65% fat, about 10–30% protein, about 10–30% carbohydrates, and about 2–8% ash. Preferred decorticated, toasted sesame seeds having about 1.9% moisture content contain about 55.4% fat, 18.9% protein, 18.3% carbohydrates, and 5.5% ash.

Other edible fats or fat-like materials useful in the present compositions include non-caloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other useful fats are medium chained triglycerides, highly esterified polyglycerol esters, acetin fats, plant sterol esters, polyoxyethylene esters, jojoba esters, mono-diglycerides of fatty acids and mono-diglycerides of short-chain dibasic acids. Sources for fats include all appropriate food sources normally used to produce food fats. Among these sources are seeds such as grape seed, sesame seed, sunflower seed, safflower seed, corn, and the like, various nuts, coconut, and various legumes. Sources for oil include all of the oil-bearing seeds, nuts and legumes disclosed below as sources for proteinaceous plant solids. Fat-like materials useful in the present invention also include sugar fatty-acid polyesters or sugar alcohol fatty-acid polyesters preferably having at least four fatty-acid ester groups, with each fatty-acid preferably having 8–22 carbon atoms (i.e. Olestra®, which is being developed by the Proctor & Gamble Co., Cincinnati, Ohio). Such polyesters and their use in conventional food products have been disclosed by Mattson et al. (U.S. Pat. No. 3,600,186), the disclosure of which is incorporated herein by reference.

Sources for edible proteinaceous plant solids which may be substituted for proteinaceous peanut solids in the present invention can include cashews, pistachio nuts, walnuts, coconut meal, Brazil nuts, almonds, hazel nuts, Macadamia nuts, pecans, hickory nuts, sesame seeds, grape seeds, sunflower seeds, safflower seeds, soybeans, acorns, locust beans, beech nuts, chestnuts, sal-nuts (ginkgo), hackberries, guiana-nut, wingnut, bean generally, and the like. It will be appreciated that large percentages of edible proteinaceous plant solids from these plants materials may be substituted for proteinaceous peanut solids in the peanut compositions of the present invention. Furthermore, it will be appreciated that the various oils which are commonly used in food products, some of which are listed herein, may be substituted for peanut oils in the present peanut-containing compositions.

Among the other functional ingredient in the peanut spread formulations of this invention include sweeteners (e.g. corn syrups), emulsifiers (e.g. lecithin, mono- and di-glycerides), salts (e.g. sodium chloride), thickeners (e.g. starches, maltodextrins and hydrophilic colloids), preservatives (e.g. potassium sorbate), opacifiers (e.g. titanium dioxide), nutrients (e.g. carbohydrates, proteins, lipids, etc.), antioxidants, antimicrobial agents, acidulants, and so on.

Sweeteners that can be added to the composition include corn syrups (typically medium or high conversion syrups), dextrose syrup, crystalline dextrose, high fructose corn syrups, crystalline fructose, sucrose and two or more of these.

Hydrophilic colloids can include natural gum material such as xanthan gum, gun tragacanth, locust bean gum, guar gum, algin, alginates, gelatin, Irish moss, pectin, gum arabic, gum ghatti, gum karaya and plant hemicelluloses, e.g. corn hull gum. Synthetic gums such as water-soluble salts of carboxymethyl cellulose can also be used. Starches and/or maltodextrins can also be added to the food. Examples of suitable starches include corn, waxy maize, wheat, rice, potato, and tapioca starches. Maltodextrins are starch hydrolysates having a dextrose equivalent (i.e. D.E. by Lane-Eynon) of from about 1 to about 20.

For flavored spreads, dry or liquid flavoring agents may be added to the formulation. These include, of course, peanut, and others such as bacon bits, grape jelly, cocoa, vanilla, chocolate, coconut, peppermint, pineapple, cherry, nuts, spices, salts, and flavor enhancers, among others.

Acidulants commonly added to foods include lactic acid, citric acid, tartaric acid, malic acid, acetic acid, phosphoric acid, and hydrochloric acid.

The following examples will illustrate the invention and variations thereof within the scope and spirit of the invention will be apparent therefrom. All parts, percentages, ratios and the like are by weight throughout this specification and the appended claims, unless otherwise noted in context.

EXAMPLES

Example 1

A peanut spread was prepared as follows:

| Ingredients | Parts by Weight |
|---|---|
| Part A | |
| Water | 35.67 |
| STELLAR TM starch hydrolysate powder (dry) (A. E. Staley Mfg. Co.) | 9.60 |
| STAR-DRI ® 24R corn syrup solids (A. E. Staley Mfg. Co.) | 3.36 |
| Xanthan | .06 |
| Part B | |
| Peanut butter | 25.9 |
| Ground peanut flour | 12.9 |
| STA-DRI 10 maltodextrin (10 DE) (A. E. Staley Mfg. Co.) | 9.3 |
| STADEX ® 128 dextrin (A. E. Staley Mfg. Co.) | 3.3 |
| Titanium dioxide | .01 |

Procedure

1. Mix Part A thoroughly (may need to puree gum into water).
2. Homogenize Part A at about 10,000 psi with an output temperature of about 58° C. using a Microfluidizer from Microfluidics Corp. Cool until firm.
3. Mix Part B ingredients and add Part A. Mix until smooth.

This peanut spread was fairly smooth and creamy. Blending with Tekmar mixer may improve. Flavor was acceptable. Product was shiny and translucent.

EXAMPLE 2

A peanut spread was prepared as follows:

| Ingredients | Parts by Weight |
|---|---|
| Part A | |
| Water | 42.34 |
| STELLAR starch hydrolysate powder | 11.60 |
| STAR-DRI 24R corn syrup solids | 4.06 |
| Xanthan | .07 |
| Part B | |
| Peanut butter (contains 0.25% MYVEROL 18-92 emulsifier and 0.25% MYVEROL 19-99 emulsifier, Eastman) | 20.61 |

-continued

| Ingredients | Parts by Weight |
|---|---|
| Ground peanut flour | 10.52 |
| STAR-DRI 10 maltodexrin | 10.90 |
| Titanium dioxide | .20 |

Procedure

As in Example 1, but mixing of step 3 employed with a Tekmar mixer.

Run 1

This was the best yet. Good color; smooth after Tekmar usage; nice spreadability; needs sweetness.

After one day evaluation (24 hrs.), product had good spreadability, but a lot of sheen. Product also needs sweetness. Perhaps titanium dioxide levels should be decreased due to extreme dull color or titanium dioxide added in Part A.

Run 2

The above procedure was repeated, but 3.5 parts by weight STALEYDEX 111 was added for sweetness. This results in a close match to the peanut butter for sweetness. Spread is still too dilute, it was shiny, and sweetener causes runniness.

EXAMPLE 3

A peanut spread was prepared as follows:

| Ingredients | Parts by Weight |
|---|---|
| Part A | |
| Water | 39.04 |
| STELLAR starch hydrolysate powder | 12.20 |
| STAR-DRI 24R corn syrup solids | 6.71 |
| STALEYDEX ® 111 crystalline dextrose (A. E. Staley Mfg. Co.) | 3.05 |
| Xanthan | .09 |
| Titanium dioxide | .09 |
| Part B | |
| Peanut butter with .5% mono- and and di-glycerides (Eastman) | 18.00 |
| Ground peanut flour | 10.00 |
| STAR-DRI 10 maltodexrin | 11.00 |

Procedure

Part A was sheared at 11,000 psi through a Microfluidizer. All ingredients were previously dispersed in water and mixed with a Kitchen Aid mixer until smooth. Part B was added to Part A and mixed with a Tekmar mixer for smoothness.

This peanut spread had a good color and texture and sweetness but it still lacked solids. After one day evaluation (24 hrs.), product had good spreadability but a lot of sheen. Product also needs sweetness. Titanium dioxide levels should perhaps be decreased due to extreme dull color.

EXAMPLE 4

A peanut spread was prepared as follows:

| Ingredients | Parts by Weight |
|---|---|
| Part A | |

-continued

| Ingredients | Parts by Weight |
|---|---|
| Water | 29.65 |
| STELLAR starch hydrolysate powder | 12.50 |
| STAR-DRI 24R corn syrup solids | 5.00 |
| STALEYDEX 111 crystalline dextrose | 2.50 |
| Salt | 0.30 |
| Titanium dioxide | 0.05 |
| Part B | |
| Peanut butter | 22.37 |
| STAR-DRI 10 maltodexrin | 14.48 |
| Ground peanut flour (30% fat) | 13.15 |

Procedure

As in Example 3.

What is claimed:

1. A composition of matter useful as a peanut spread comprising a macroscopically homogeneous blend of a peanut component and an aqueous dispersion of a fragmented granular starch hydrolysate comprised of a major amount of cold-water insoluble starch hydrolysate and a minor amount of cold-water soluble hydrolysate, wherein the amount of said fragmented granular starch hydrolysate in said dispersion is sufficient in relation to the amount of water in said aqueous dispersion and any oil in said composition to make said composition non-flowable.

2. A composition of claim 1 wherein the ratio of the major amount of cold-water insoluble starch hydrolysate to the minor amount of cold-water soluble starch hydrolysate is from about 3.0:1 to no greater than about 9:1.

3. A composition of claim 1 wherein said granular starch hydrolysate has a weight average molecular weigh of from about 4,000 to about 7,500 g/mol.

4. A composition of claim 1 wherein said granular starch hydrolysate is derived from a starch having a major proportion of amylopectin.

5. A composition of claim 1 wherein said granular starch hydrolysate will form an aqueous dispersion having a yield stress of from about 100 to about 1,500 pascals when fragmented in an aqueous medium at 20% starch hydrolysate solids.

6. A composition of claim 1 further comprising a minor amount of a salt selected from the group consisting of alkali metal chlorides, alkali metal sulfates, alkaline earth metal chlorides, alkaline earth metal sulfates, and mixtures of two or more thereof and wherein said salt is present in an amount of at least about 0.1% by weight of said starch hydrolysate.

7. A composition of claim 1 wherein the weight ratio of said peanut component to said aqueous dispersion of fragmented starch hydrolysate is from about 5:1 to about 1:5.

8. A composition of claim 1 wherein said peanut component is comprised of a full fat peanut butter and a partially defatted peanut meal or flour.

9. A composition of claim 1 wherein said peanut component is comprised of a full fat peanut material and a partially defatted peanut material, wherein essentially all of the fat in said composition is present in said peanut component and the amount of each of said full fat peanut material and said partially defatted peanut material are effective to produce a composition wherein no more than 30% of the calories available from such composition are from fat.

10. A composition of matter useful as a peanut spread comprising a macroscopically homogeneous blend of a peanut component and an aqueous dispersion of a fragmented granular starch hydrolysate having a molecular weight of from about 4,000 to about 7,500 g/mol and comprised of a major amount of cold-water insoluble starch hydrolysate and a minor amount of cold-water soluble hydrolysate, the ratio of said major amount of cold-water insoluble starch hydrolysate to said minor amount of cold-water soluble starch hydrolysate is from about 3.0:1 to no greater than about 9:1, wherein said granular starch hydrolysate will form an aqueous dispersion having a yield stress of from about 100 to about 1,500 pascals when fragmented in an aqueous medium at 20% starch hydrolysate solids, said composition further comprising a salt selected from the group consisting of alkali metal chlorides, alkali metal sulfates, alkaline earth metal chlorides, alkaline earth metal sulfates, and mixtures of two or more thereof, in an amount of at least about 0.1% by weight of said starch hydrolysate, wherein the amount of said fragmented granular starch hydrolysate in said dispersion is sufficient in relation to the amount of water in said aqueous dispersion and any oil in said composition to make said composition non-flowable.

11. A method of preparing a composition useful as a peanut spread comprising:

preparing a premix comprising a major amount of water and a minor amount of a granular starch hydrolysate, the hydrolysate comprising a major amount of cold-water insoluble starch hydrolysate and a minor amount of cold-water soluble hydrolysate;

fragmenting said granular starch hydrolysate in said premix under conditions effective to result in the production of an aqueous particle gel of said granular starch hydrolysate; and blending said aqueous particle gel with a peanut component and mixing said blend to produce a macroscopically homogeneous peanut spread.

12. A method of claim 11 wherein the ratio of the major amount of cold-water insoluble starch hydrolysate to the minor amount of cold-water soluble starch hydrolysate is from about 3.0:1 to no greater than about 9:1.

13. A method of claim 11 wherein said granular starch hydrolysate has a weight average molecular weight of from about 4,000 to about 7,500 g/mol.

14. A method of claim 11 wherein said granular starch hydrolysate is derived from a starch having a major proportion of amylopectin.

15. A method of claim 11 wherein said particle gel has a yield stress of from about 100 to about 1,500 pascals at 20% starch hydrolysate solids.

16. A method of claim 11 further comprising a minor amount of a salt selected from the group consisting of alkali metal chlorides, alkali metal sulfates, alkaline earth metal chlorides, alkaline earth metal sulfates, and mixtures of two or more thereof and wherein said salt is present in an amount of at least about 0.1% by weight of said starch hydrolysate.

17. A method of claim 11 wherein the weight ratio of said peanut component to said aqueous dispersion of fragmented starch hydrolysate is from about 5:1 to about 1:5.

18. A method of claim 11 wherein said peanut component is comprised of a full fat peanut butter and a partially defatted peanut meal or flour.

19. A method of claim 1 wherein said peanut component is comprised of a full fat peanut material and a partially defatted peanut material, wherein essentially all of the fat in said composition is present in said peanut component and the amount of each of said full fat peanut material and said partially defatted peanut material are effective to produce a composition wherein no more than 30% of the calories available from such composition are from fat.

20. A method of preparing a composition useful as a table spread comprising:

preparing a premix of a granular starch hydrolysate having a molecular weight of from about 4,000 to about 7,500 g/mol and comprised of a major amount of cold-water insoluble starch hydrolysate and a minor amount of cold-water soluble hydrolysate, the ratio of said major amount of cold-water insoluble starch hydrolysate to said minor amount of cold-water soluble starch hydrolysate is from about 3.0:1 to no greater than about 9:1, said premix further comprising a salt selected from the group consisting of alkali metal chlorides, alkali metal sulfates, alkaline earth metal chlorides, alkaline earth metal sulfates, and mixtures of two or more thereof, in an amount of at least about 0.1% by weight of said starch hydrolysate;

fragmenting said granular starch hydrolysate to form a particle gel having a yield stress of from about 100 to about 1,500 pascals when fragmented in an aqueous medium at 20% starch hydrolysate solids; and blending said aqueous particle gel with a peanut component at a weight ratio of from about 5:1 to about 1:5 of peanut component to aqueous particle gel and mixing said blend to produce a macroscopically homogeneous peanut spread.

* * * * *